(12) United States Patent
Storch et al.

(10) Patent No.: US 11,406,481 B2
(45) Date of Patent: Aug. 9, 2022

(54) LASER-ENHANCED OPTICAL ELEMENT

(71) Applicant: KONINKLIJKE PHILIPS N.V., Eindhoven (NL)

(72) Inventors: David Storch, Seattle, WA (US); Andreas Gardeback, Sammamish, WA (US); Regan Starkey Foster, Lynnwood, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 16/960,569

(22) PCT Filed: Jan. 2, 2019

(86) PCT No.: PCT/EP2019/050012
§ 371 (c)(1),
(2) Date: Jul. 8, 2020

(87) PCT Pub. No.: WO2019/137834
PCT Pub. Date: Jul. 18, 2019

(65) Prior Publication Data
US 2020/0390533 A1    Dec. 17, 2020

Related U.S. Application Data

(60) Provisional application No. 62/615,515, filed on Jan. 10, 2018.

(51) Int. Cl.
| | | |
|---|---|---|
| *A61C 17/22* | (2006.01) | |
| *A46B 15/00* | (2006.01) | |
| *F21V 3/04* | (2018.01) | |

(Continued)

(52) U.S. Cl.
CPC ........ *A61C 17/225* (2013.01); *A46B 15/0044* (2013.01); *F21V 3/049* (2013.01);
(Continued)

(58) Field of Classification Search
CPC .... F21V 3/049; F21V 33/004; F21V 33/0004; A61C 17/225; A61B 15/0044;
(Continued)

(56) References Cited

U.S. PATENT DOCUMENTS

| | | | |
|---|---|---|---|
| 6,029,304 A | 2/2000 | Hulke | |
| 6,301,418 B1* | 10/2001 | Freier | G02B 6/001 362/558 |
| 6,714,711 B1* | 3/2004 | Lieberman | G01N 21/7703 362/552 |
| 7,654,679 B2* | 2/2010 | Mezouari | G01D 11/28 362/23.01 |

(Continued)

FOREIGN PATENT DOCUMENTS

| | | | |
|---|---|---|---|
| CN | 204719255 U | 10/2015 | |
| CN | 206167092 U | 5/2017 | |
| FR | 2683071 | * 4/1993 | ........... G02B 6/0013 |

(Continued)

OTHER PUBLICATIONS

English Translation, FR 2683071, Moehler, Date Apr. 1993 (Year: 1993).*
International Search Report dated Apr. 16, 2019.

*Primary Examiner* — Peggy A Neils (57) ABSTRACT

A handheld device (100) including a housing; at least one light source arranged within the housing, the at least one light source configured to emit light in at least a first direction; an optical element (300) comprising an inside surface (A) facing the at least one light source and an outside surface (B) opposite the inside surface, the optical element configured to transmit light from the light source; and a plurality of laser-induced modifications (302) formed on the inside surface or inside the optical element and configured to alter a transmission of light through the optical element.

17 Claims, 9 Drawing Sheets

(51) Int. Cl.
*F21V 33/00* (2006.01)
*F21Y 115/10* (2016.01)

(52) U.S. Cl.
CPC .... *F21V 33/004* (2013.01); *A46B 2200/1066* (2013.01); *F21Y 2115/10* (2016.08)

(58) Field of Classification Search
CPC ........ A61B 2200/1066; A61B 15/0036; F21Y 2115/10; G02B 6/0013; G02B 6/0018; A46B 15/0044; A46B 2200/1066; A46B 15/0036
See application file for complete search history.

(56) References Cited

U.S. PATENT DOCUMENTS

| | | | |
|---|---|---|---|
| 8,721,113 B2* | 5/2014 | Lai | F21K 9/69 362/217.02 |
| 8,763,189 B2* | 7/2014 | Jungnickel | A46B 15/0012 15/22.1 |
| 2012/0137454 A1 | 6/2012 | Huy | |
| 2013/0000059 A1* | 1/2013 | Jungnickel | A46B 15/0012 15/22.1 |
| 2016/0025294 A1* | 1/2016 | Dijken | F21V 9/40 362/84 |
| 2017/0002993 A1 | 1/2017 | Yun | |
| 2017/0146214 A1 | 5/2017 | Purchase | |

FOREIGN PATENT DOCUMENTS

| | | |
|---|---|---|
| KR | 20120084519 A | 7/2012 |
| WO | 2017129509 A1 | 8/2017 |

\* cited by examiner

LASER-ENHANCED OPTICAL ELEMENT

This application is the U.S. National Phase application under 35 U.S.C. §371 of International Application No. PCT/EP2019/050012, filed on Jan. 2, 2019, which claims the benefit of U.S. Provisional Application Ser. No. 62/615,515, filed Jan. 10, 2018. These applications are hereby incorporated by reference herein.

FIELD OF THE INVENTION

The present disclosure generally relates to systems and methods for distributing light emitted from one or more light sources within a housing of a handheld device using a laser-enhanced optical element to provide sufficiently distributed light within limited space.

BACKGROUND

Personal care devices include lighting elements to provide a form of communication with a user. For example, some toothbrushes including light emitting diodes (LEDs) are configured to internally reflect emitted light along the inside of the device and emit a diffused glow through predefined exposed areas in the outer covering of the device to provide feedback to a user. Other devices include one or more light rings to provide a visual cue.

However, due to cost and space constraints, such systems are limited in the type and/or number of optical sources and optical elements and the LED light cannot be sufficiently distributed by bulk scattering. Accordingly, there is a non-uniformity of light intensity from different angles of view. For example, as the device is rotated along its primary axis, alternating hot and dark spots are visible. The dark spots indicate spaces between the LEDs. Additionally, light tailoring features cannot be easily added.

Typically, additional LEDs, separate optics, vapor deposited reflection layers, or screens and/or masks are employed to facilitate in the distribution of LED light. However, such systems are costly and/or require significant space and tactile access to the screen and/or mask areas for manufacturability. Such typical systems also require specific tooling and manufacturing processes such that the screens or masks cannot be easily changed in manufacturing.

Accordingly, there is a need in the art for systems and methods for providing handheld devices including a minimal number of light sources and optical elements configured to achieve sufficiently distributed light to produce visibly uniform light.

SUMMARY OF THE INVENTION

The present disclosure is directed to inventive systems and methods for altering the transmission of light emitted from one or more light sources within a housing of a handheld device using an optical element enhanced by laser-induced modifications. For example, an optical element can be a light ring and the inside surface of the light ring, facing a light source, may be modified to change the light incident angle of the incoming light rays from the LED. The modified surface causes optical scattering at the incoming surface which can add to a scattering of light generated by bulk material scattering within the optical element. A polymer surface of the optical element can be modified by applying a sufficient amount of thermal energy from a laser to reflow the surface. The modified surface can include one or more dimple-shaped modifications, for example. An array of dimple-shaped laser-induced modifications in close proximity acts as a plurality of tiny convex lenses which facilitate the scattering of incoming LED light rays. By way of another example, the inside surface can be modified to include darkened regions which absorb more light (than non-darkened regions) to partially block light from passing through the optical element. The darkened regions can be formed by laser energy and frequency in combination with one or more suitable polymer additives to generate thermal chemical carbonization, also known as charring. An optical element can be modified to include one or more reflow areas and/or one or more darkened regions to vary the transparency and scattering effect of the optical element.

An advantage of the systems and methods described herein is that the laser-enhanced optical element can solve the problem with non-uniformity concerns with LED light sources within tight space constraints and without costly additional components.

Another advantage of the systems and methods described herein is that light-tailoring laser-induced modifications can be added in very small spaces where conventional assembly solutions are not possible.

Yet another advantage of the systems and methods described herein is that the laser-enhanced optical element provides the flexibility to modify the final output almost immediately, enabling unique light performance in each product manufactured.

Generally in one aspect, a handheld device is provided. The handheld device includes: a housing; at least one light source arranged within the housing, the at least one light source configured to emit light in at least a first direction; an optical element comprising an inside surface facing the at least one light source and an outside surface opposite the inside surface, the optical element configured to transmit light from the light source; and a plurality of laser-induced modifications formed on the inside surface or inside the optical element and configured to alter the transmission of light through the optical element.

According to an embodiment, the plurality of laser-induced modifications is configured to provide a uniform distribution of light on the outside of the optical element.

According to an embodiment, the plurality of laser-induced modifications is configured to provide a non-uniform distribution or tailored distribution of light on the outside of the optical element.

According to an embodiment, the optical element includes a bulk scattering material to produce a bulk material scattering effect of the light when the light passes through the optical element and the plurality of laser-induced modifications provides a surface scattering of the light when the light passes through the optical element.

According to an embodiment, the plurality of laser-induced modifications includes dimple-shaped modifications.

According to an embodiment, the plurality of laser-induced modifications is variably distributed over the inside surface.

According to an embodiment, the plurality of laser-induced modifications includes one or more charred dots.

According to an embodiment, the one or more charred dots block one or more respective portions of light emitted from the at least one light source from being transmitted through the optical element.

According to an embodiment, the one or more charred dots are formed by laser energy in combination with one or more polymer additives.

According to an embodiment, the at least one light source is a light emitting diode.

Generally in another aspect, a handheld device is provided. The handheld device includes: a housing; at least one light source arranged within the housing, the at least one light source configured to emit light in at least a first direction; an optical element including an inside surface facing the at least one light source, an outside surface opposite the inside surface, a top surface facing a second direction, different than the first direction, and a bottom surface opposite the top surface, the optical element configured to transmit light from the light source; and a plurality of laser-induced modifications formed on the top surface or inside the optical element and configured to alter the transmission of light through the optical element.

According to an embodiment, the plurality of laser-induced modifications is configured to provide a uniform distribution of light on the outside of the optical element.

According to an embodiment, the plurality of laser-induced modifications is configured to provide a non-uniform distribution or tailored distribution of light on the outside of the optical element.

According to an embodiment, the plurality of laser-induced modifications comprises ribs configured to direct light away from a LED hot spot vector of the at least one light source.

According to an embodiment, the plurality of laser-induced modifications comprises circular lines centered at a LED hot spot vector of the at least one light source.

As used herein for purposes of the present disclosure, the term "controller" is used generally to describe various apparatus relating to the operation of a personal handheld device, system, or method. A controller can be implemented in numerous ways (e.g., such as with dedicated hardware) to perform various functions discussed herein. A "processor" is one example of a controller which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present disclosure discussed herein. The terms "program" or "computer program" are used herein in a generic sense to refer to any type of computer code (e.g., software or microcode) that can be employed to program one or more processors or controllers.

The term "light source" should be understood to refer to any one or a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, and other types of electroluminescent sources.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), laser diodes, electroluminescent strips, and the like. It should also be understood that the term LED does not limit the physical and/or electrical package type of an LED.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

These and other aspects of the invention will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

DETAILED DESCRIPTION OF EMBODIMENTS

The present disclosure is directed to various embodiments of systems and methods for producing visibly uniform light from a minimal number of light sources and optical elements within a handheld device using a laser-enhanced optical element. Applicant has recognized and appreciated that it would be beneficial to provide an effective lighting system for handheld devices using a minimal number of light sources and optical elements by modifying the transparency and scattering effects of the surfaces of the optical elements (rather than focusing on material scattering properties, reflective surface design, and/or light pipe solutions). Accordingly, the systems and methods described or otherwise envisioned herein provide a handheld device configured to provide light emitted from LEDs and a laser-enhanced optical element. The enhancement of the surface of the optical element modifies the transmission of light emitted from one or more light sources by providing scattering effects and/or redirecting effects. Additionally or alternatively, the enhancement of the surface of the optical element modifies the transmission of light emitted from one or more light sources by masking or blocking light from passing through the optical element.

The embodiments and implementations disclosed or otherwise envisioned herein can be utilized with any device, including a handheld personal care device. A particular non-limiting goal of utilization of the embodiments and implementations herein is to provide brushing information/indications to a user of a power toothbrush, e.g., a Philips Sonicare™ toothbrush (manufactured by Koninklijke Philips, N.V.). Such information can, for example, be related to error or alert messages (e.g., battery due to be changed/charged, change brush head), instruction or indications related to proper use of the power toothbrush, timer, sensory result messages (e.g., fully cleaned teeth, partially cleaned teeth, good brushing behavior, poor brushing behavior, plaque formation). According to other embodiments and implementations, pertinent information/indications can be provided to users of any power medical, dental, shaving, grooming, mother and child care devices (handheld and non-handheld), for example, which can incorporate the configurations and functionalities described herein (as should be appreciated by a person of ordinary skill in the art in conjunction with a review of this disclosure).

Figure 1:
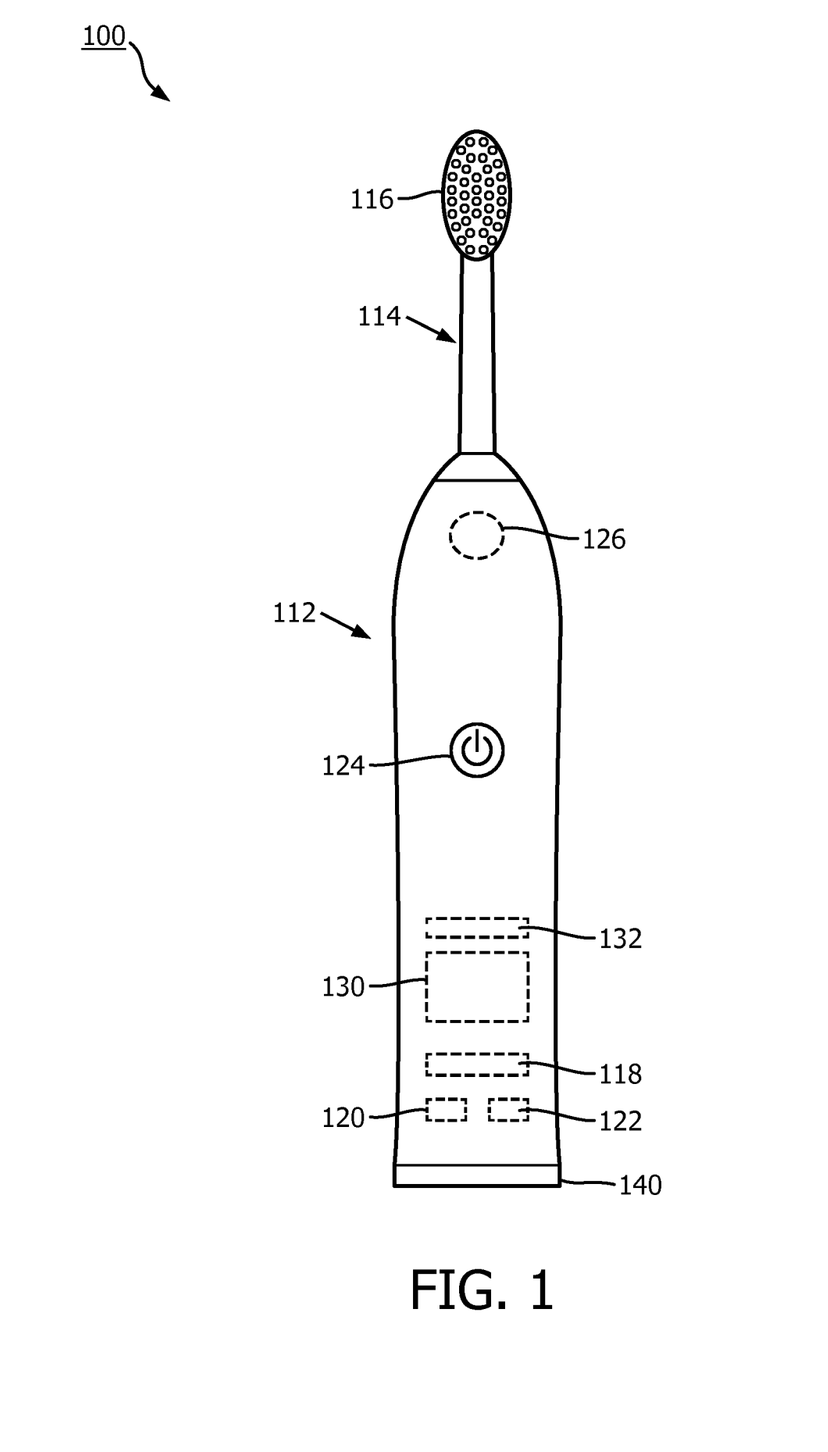
FIG. 1 is a bristle side view of a power toothbrush having an illumination system in accordance with an embodiment.

Referring to FIG. 1, in one embodiment, a handheld device 100 is provided. The handheld device 100 includes a body portion 112 and a neck portion 114 removably or non-removably mounted to the body portion 112. The neck portion 114 includes a head member 116. The body portion 112 includes a housing, at least a portion of which is hollow, to contain components of the handheld device, for example, a drive assembly/circuit 118, a control unit 120, and a power source 122 (e.g., battery or power cord) for producing a brush head motion suitable for effective cleaning of teeth. The movement can be any of a variety of different movements, including vibrations or rotation, among others. The illustrative elements are shown representationally because they are conventional in the art of power toothbrushes. The operation of the toothbrush itself is controlled by an on/off switch 124. The particular configuration and arrangement shown in FIG. 1 is by way of example only and does not limit the scope of the embodiments disclosed below.

The handheld device 100 can include one or more sensors 126 configured to obtain sensor data and located on or within the device. Sensor 126 is shown in FIG. 1 near the top of the body portion/handle 112, but may be located anywhere on the device, including, for example, within the neck portion 114 or head member 116, to sense brushing information. Processor 130 is preferably located within the device and configured to receive sensor data from the one or more sensors 126 and process the sensor data obtained from sensor 126. The handheld device 100 can include one or more light emitting diodes and a laser-enhanced optical element forming an illumination system 140 which may be located on and/or within the device. In FIG. 1, the illumination system 140 is located at the bottom of the body portion 112 of the handheld device 100. In other embodiments, the illumination system 140 can be located on and/or within the switch 124 or at any other position. The illumination system 140 can be responsive to a processor and configured to communicate information/indications to the user. In some embodiments, a storage system/memory 132 for storing brushing information may be included for further analysis of information.

Figure 2:
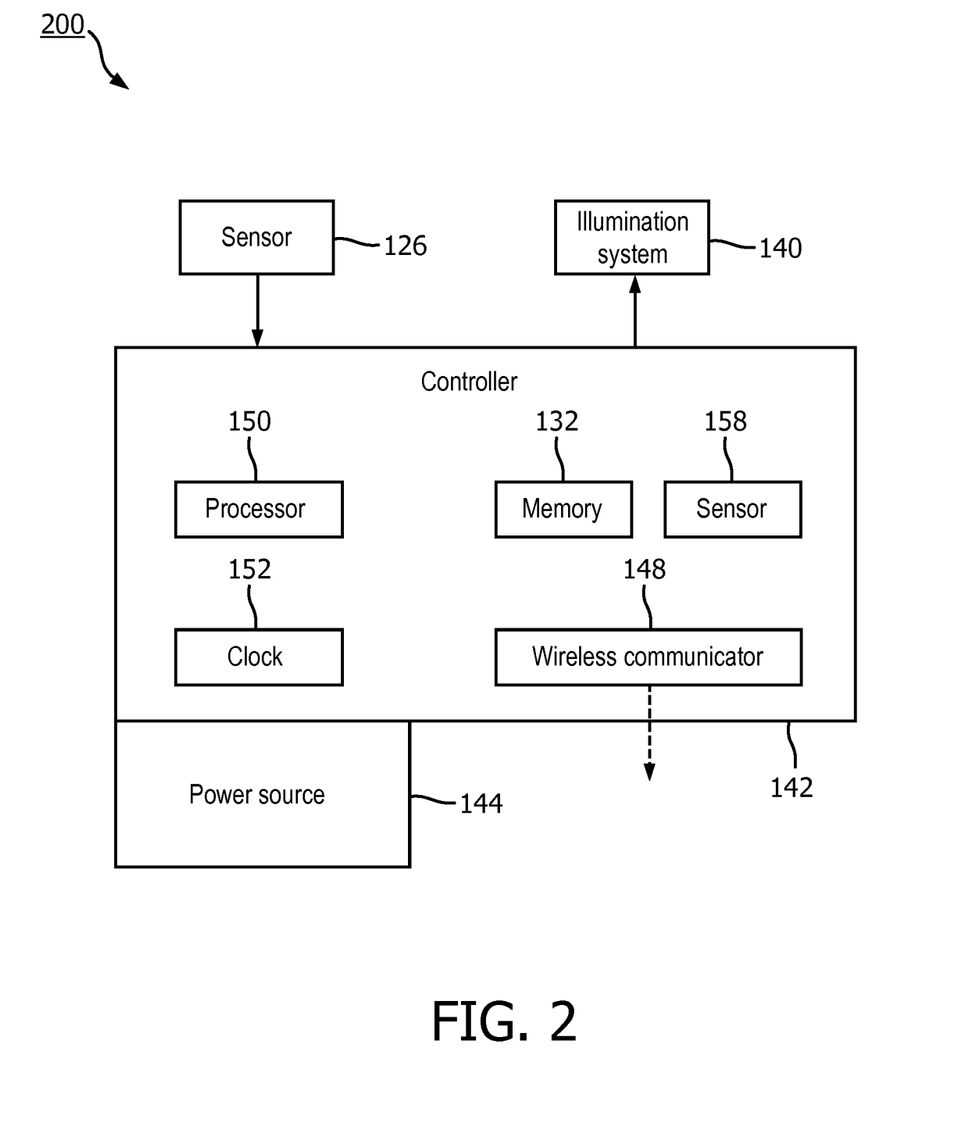
FIG. 2 is a schematic representation of a control system of a power toothbrush in accordance with an embodiment.

FIG. 2 depicts a schematic representation of an exemplary control system 200 of an example handheld device. The control system 200 includes a controller 142, a sensor 126, a power source 144, and an illumination system 140. Power source 144 may be the same as power source 122 for the handheld device 100, or can be a separate power source. Sensor 126 can be any sensor programmed and/or configured to obtain sensor data regarding one or more aspects of the user's mouth during a brushing session. For example, the sensor may obtain information/data about the teeth surface, plaque levels, brushing areas, brushing strength, brushing angle, overall brushing effectiveness, and/or a wide variety of other aspects of dental health as described elsewhere herein. The sensor data may also relate to the operating status (on/off condition, normal condition, abnormal condition, battery life, and speed of the motor) of the power toothbrush and other related data. The illumination system 140 can be programmed and/or configured to direct light emitted from one or more LED light sources within a hollow portion of the housing of the handheld device through an optical element, for example, a light ring, to provide uniform lighting or any pattern or image on the exterior surface of the illumination system 140 to be visible from a user's perspective. In an example embodiment, four LEDs are included however, additional or fewer LEDs are also contemplated.

Controller 142 is programmed and/or configured to analyze information/data, transmit/receive information, data and/or commands (control signals) from/to each of the other respective components of the system or external components/devices as may be appropriate to carry out the functions and methods described herein (as should be appreciated and understood by those of skill in the art in conjunction with a review of this disclosure).

The controller 142 includes processor 150, memory 132, clock 152, wireless communicator 148, and sensor 158.

Processor 150 may be the same as processor 130, or can be a separate processor. The controller 142 can determine, using sensor data received in real-time or periodically, the information about how the user is brushing his/her teeth. The sensor data can be processed by processor 150. Processor 150 can pull pre-programmed levels from memory 132 and compare that to the obtained sensor data to determine whether the user is brushing his/her teeth with too much pressure. Clock 152 may be utilized by controller 142 in order to determine the brushing time, duration, and date, and may be utilized by controller 142 in order to recall the appropriate standards from memory 132. Processor 150 can further determine, based on stored information, what response may be necessary for excessive pressure, and can pull from memory 132 the appropriate illumination to provide to the user. For example, if the pressure is too high, the controller 142 can be programmed and/or configured to effectuate the selective illumination of light of a certain color, for example, orange (to indicate to the user that too much pressure is being applied) through illumination system 140. The control system 200 may also include a wireless communicator 148 for transmitting sensor data to a wireless transceiver (not shown). Sensor 158 may also be included in the control system 200 to detect motion using any variety of different motion-detecting sensors, and can send a signal to the processor 150 that the user has picked up the toothbrush and that an appropriate illumination can be provided as may be appropriate during a brushing event (although, information about the power toothbrush 100 itself (such as charging status) can be sensed by either sensor 126 or 158 and indicated through illumination means 140 at any time).

Figure 3:
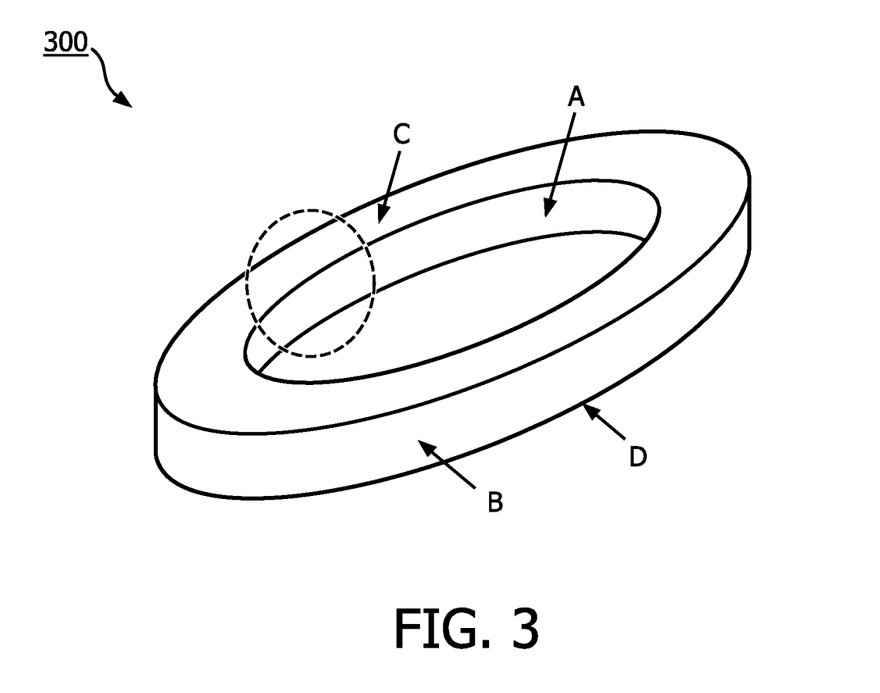
FIG. 3 is a schematic representation of a laser-enhanced optical element of the illumination system of FIG. 1, in accordance with an embodiment.

FIG. 3 is a perspective view of an example optical element 300 of an illumination system 140 of a handheld device 100. The optical element 300 of FIG. 3 is embodied as a light ring including an inside surface A, an outside surface B opposite the inside surface, a top surface C, and a bottom surface D opposite the top surface. The inside and outside surfaces A, B are circumferential surfaces circumscribing an axis of rotation of the light ring, whereas the top and bottom surfaces C, D are radial surfaces running in parallel planes arranged orthogonal to the axis of rotation of the light ring. Although a ring is depicted here, it should be appreciated that the optical element 300 can be embodied as any shape. In the example of FIG. 3, the surfaces are planar, however they can also be curved. Further, it should be appreciated that, in the embodiments described or otherwise envisioned herein, at least one light source is arranged within the inside surface A of the optical element 300 such that the inside surface A faces the at least one light source and the at least one light source emits light substantially in a first direction toward the inside surface A of the optical element 300. The terms "optical element" and "light ring" are used interchangeably herein.

Figure 4:
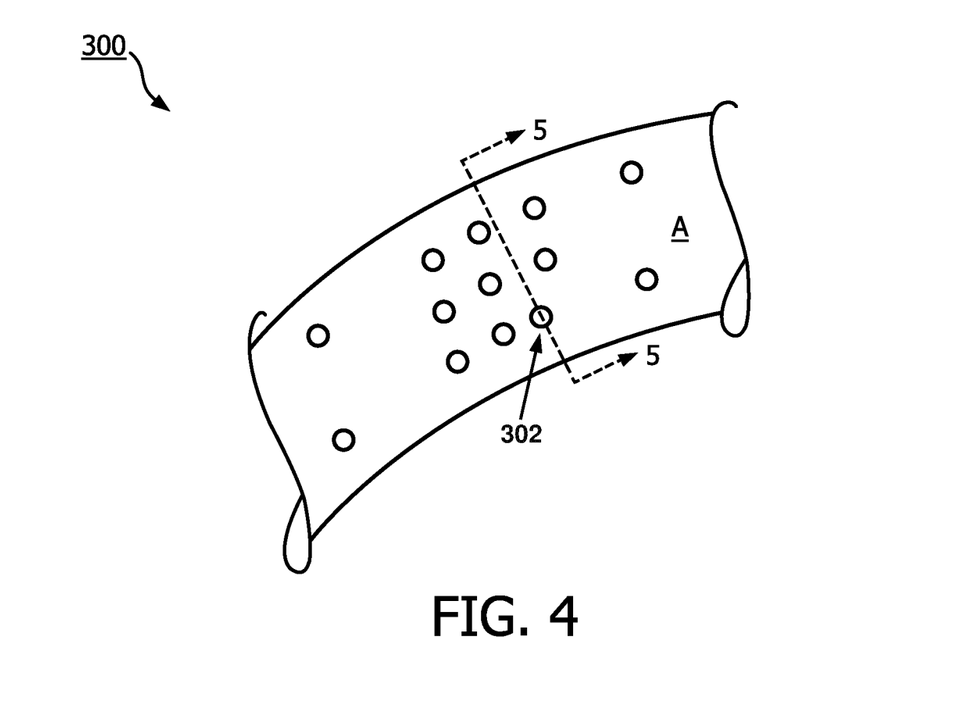
FIG. 4 is a schematic representation of a section of the optical element of FIG. 1, in accordance with an embodiment.

As shown in FIG. 4, inside surface A of the optical element 300 may be modified to change the light incident angle of incoming light rays from one or more LEDs. Due to the modified configuration of the surface, optical scattering can occur at inside surface A to redirect LED light rays. In addition to the optical scattering that can occur at the inside surface A, the light can be further distributed, or scattered, as the light passes through the bulk material of the optical element 300. In example embodiments including an optical element formed of a polymer at least partially, the surface configuration of the inside surface A can be modified by using laser marking.

Laser marking refers to computerized methods of applying marks, including bar codes, logos, or other information to surfaces of products using a laser beam rather than inks or tool bits. Laser marks are created by a variety of processes, some involving removing material from the surface, for example, by vaporization, others involving a thermal-chemical surface reaction mechanism, for example, by melting. One such surface reaction mechanism is thermal-chemical carbonization, or charring. In plastics, a laser and a corresponding appropriate additive can cause thermal degradation in a polymer resulting in the formation of a black or dark marking for light colored plastics (or a white or light marking for dark colored plastics). Laser marking by charring produces darkened regions which absorb more light than un-darkened regions.

Referring back to FIG. 4, inside surface A can be modified using laser marking by transforming radiation energy into thermal energy in the polymer surface. The thermal energy can be sufficient to cause reflow of the polymer surface embodied as dimple-shaped laser-induced modifications, for example. An array of dimple-shaped laser-induced modifications in close proximity can act as many tiny convex lenses which facilitate to scatter the incoming LED light rays. Laser-induced modifications including reflow lenses (or dimple-shaped laser-induced modifications) are shown on inside surface A in FIG. 4.

Figure 5:
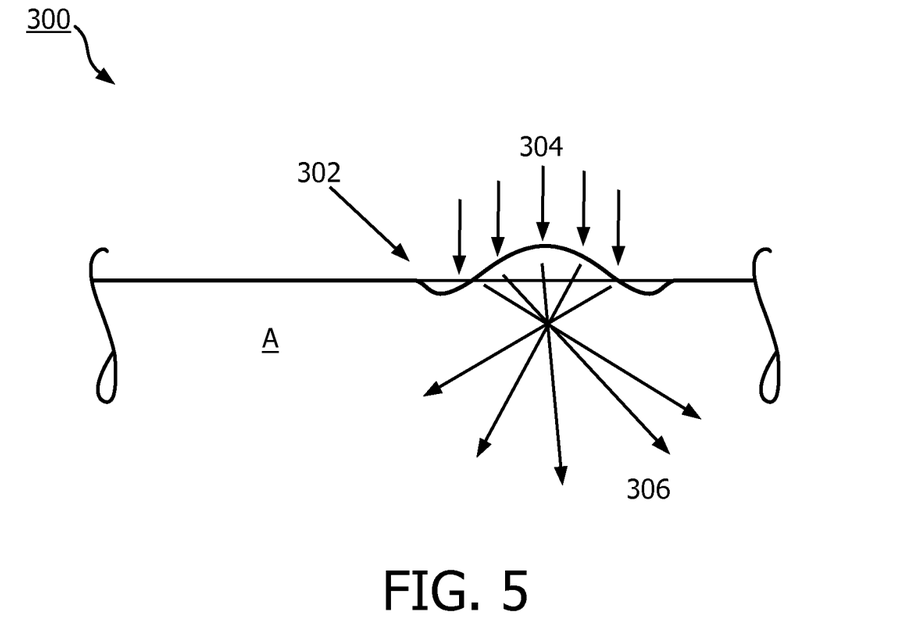
FIG. 5 is a schematic sectional representation of the section of FIG. 4, taken generally along line 5-5 in FIG. 4, in accordance with an embodiment.

FIG. 5 shows a schematic sectional representation of the inside surface A of FIG. 4, taken generally along line 5-5 in FIG. 4, including a single reflow lens 302 (or dimple-shaped modification). The left side of the inside surface A depicts unmarked polymer surface, whereas the right side of the inside surface A (including the single reflow lens 302) depicts modified polymer surface. The incoming LED rays 304 emitted by at least one LED become scattered rays 306 due to the single reflow lens 302. It should be appreciated that air surrounds the single reflow lens 302 between the LED emitting the LED rays 304 and the inside surface A.

Figure 6:
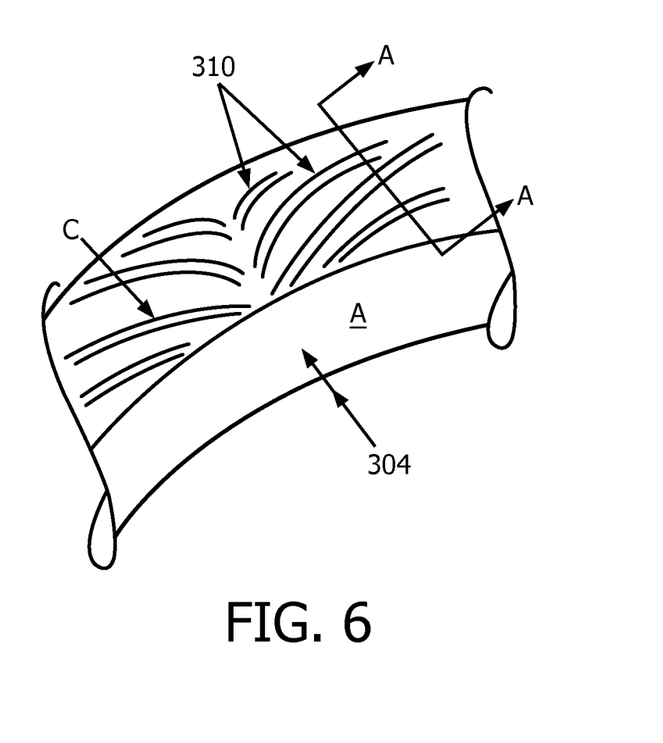
FIG. 6 is a schematic representation of a section of a laser-enhanced optical element of an illumination system, in accordance with an embodiment.
Figure 7:
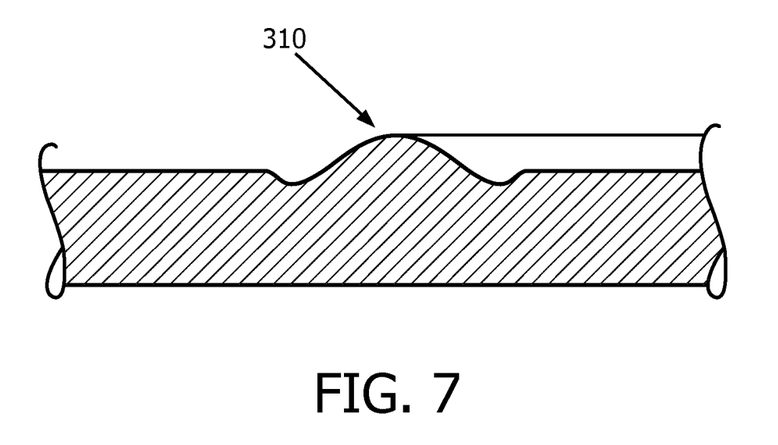
FIG. 7 is a schematic sectional representation of the section of FIG. 6, taken generally along line A-A in FIG. 6, in accordance with an embodiment.

In FIG. 6, the top surface C is modified (instead of inside surface A) to include a plurality of laser-induced modifications including reflow ribs 310. The reflow ribs 310 are configured to direct light away from a LED hot spot vector of the light source. The reflow ribs 310 act as waveguides to re-pipe the light away from the LED hot spot vector. FIG. 7 is a schematic sectional representation of the section of FIG. 6, taken generally along line A-A in FIG. 6.

Figure 8:
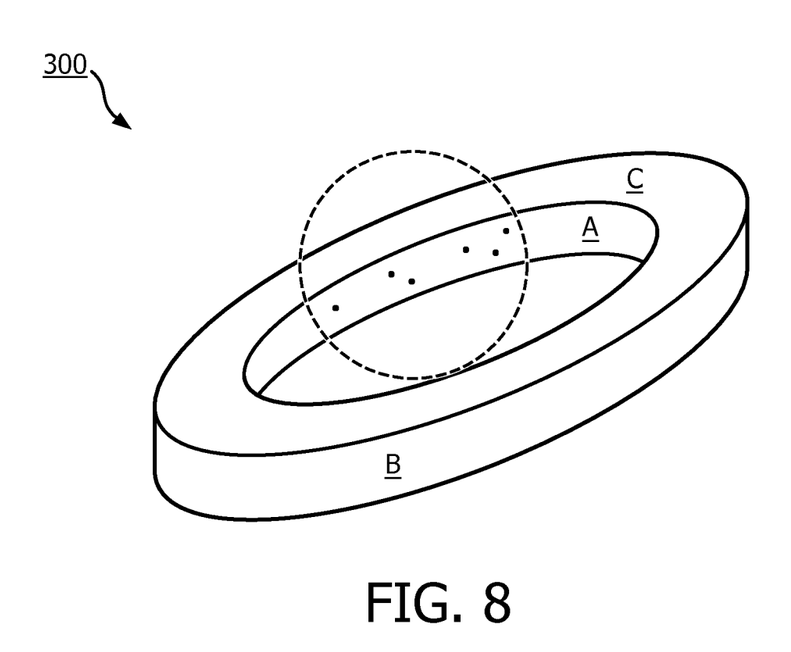
FIG. 8 is a schematic representation of the optical element of FIG. 3, in accordance with an embodiment.
Figure 9A:
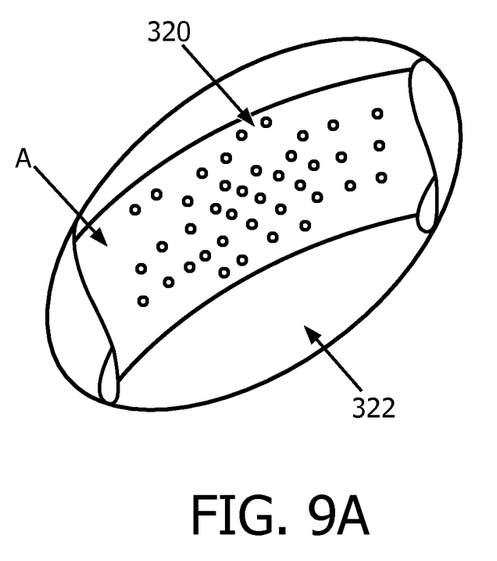
FIG. 9A is an enlarged schematic representation of the encircled section of the optical element in FIG. 8, in accordance with an embodiment.

FIG. 8 is a perspective view of an example optical element 300 including a pattern of laser-induced modifications embodied as a mask 320 formed on the inside surface A. FIG. 9A is an enlarged schematic representation of the encircled section of the optical element in FIG. 8. In example embodiments including an optical element formed of a polymer at least partially, a transparency of the inside surface A can be modified by laser energy and frequency in combination with one or more special polymer additives to produce thermal chemical carbonization, also known as charring. Charring the polymer causes a darkening of the surface which absorbs more light than uncharred areas. One pattern of laser-induced modifications, for example, a plurality of carbonization markings, or charred dots, is shown on the inside surface A of FIG. 9A. The shape of each marking or dot can be circular or any other suitable shape. The laser-induced modifications in FIG. 9A includes an area having an increased density of darkened spots to reduce light transmittance of a LED hot spot vector 322. In embodiments, the increased density of the markings can decrease as a distance along the inside surface A increases relative to the LED hot spot vector 322. In other words, the markings can be tailored to be distributed as the inverse of the LED intensity sphere. For example, the larger the incoming light intensity, the smaller the spacing to block more transmission of the incoming light. Similarly, the smaller the incoming light intensity, the larger the spacing to allow more transmission of the incoming light. In other words, laser-induced modifications can be configured to gradually mask high intensity light regions while allowing lower intensity regions to pass through to the bulk material. This gradient mask produces a uniform output intensity distribution.

Figure 9B:
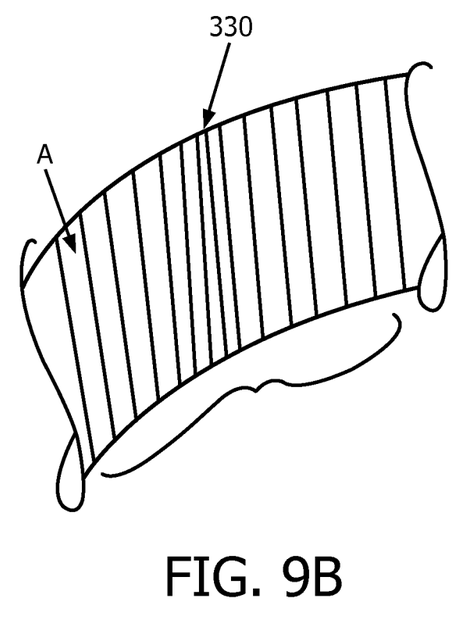
FIG. 9B is an alternate representation of the encircled section of the optical element in FIG. 8, in accordance with an embodiment.
Figure 9C:
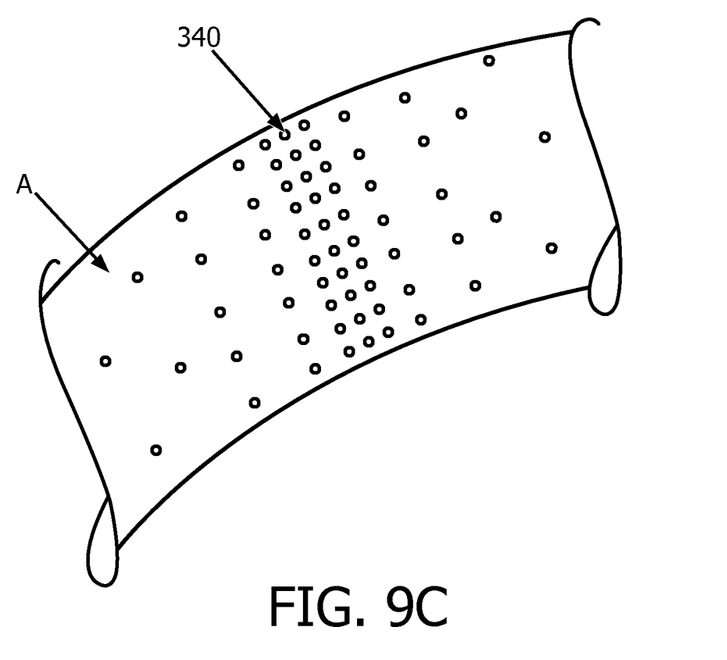
FIG. 9C is an alternate representation of the encircled section of the optical element in FIG. 8, in accordance with an embodiment.
Figure 9D:
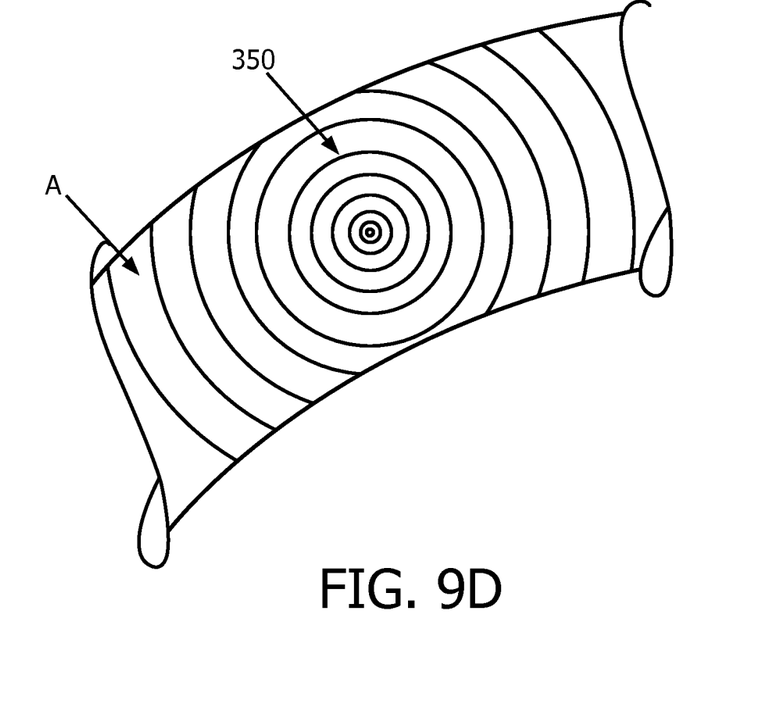
FIG. 9D is an alternate representation of the encircled section of the optical element in FIG. 8, in accordance with an embodiment.

FIG. 9B shows an alternate embodiment of laser-induced modifications including darkened lines 330 with variable spacing. In example embodiments, inside surface A can also be modified to create a diffraction grate corresponding to the darkened lines 330. FIG. 9C shows an alternate embodiment of laser-induced modifications including spots 340 having a variable density to distribute a scattering effect corresponding to a LED hot spot. FIG. 9D shows an alternate embodiment of laser-induced modifications including a circular diffraction grate 350 to provide scattering at a LED hot spot and more vertically where more LED intensity is needed.

Figure 9E:
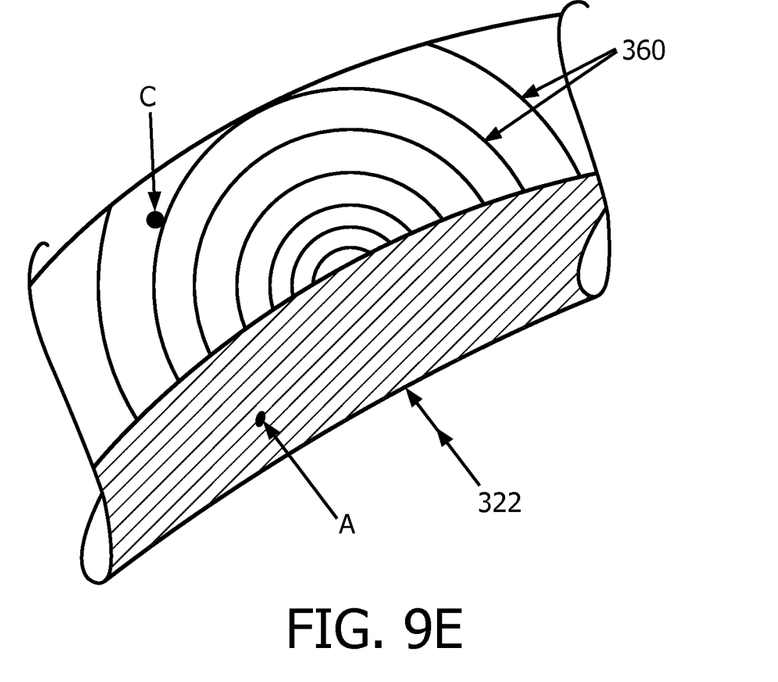
FIG. 9E is an alternate representation of the encircled section of the optical element in FIG. 8, in accordance with an embodiment.
Figure 9F:
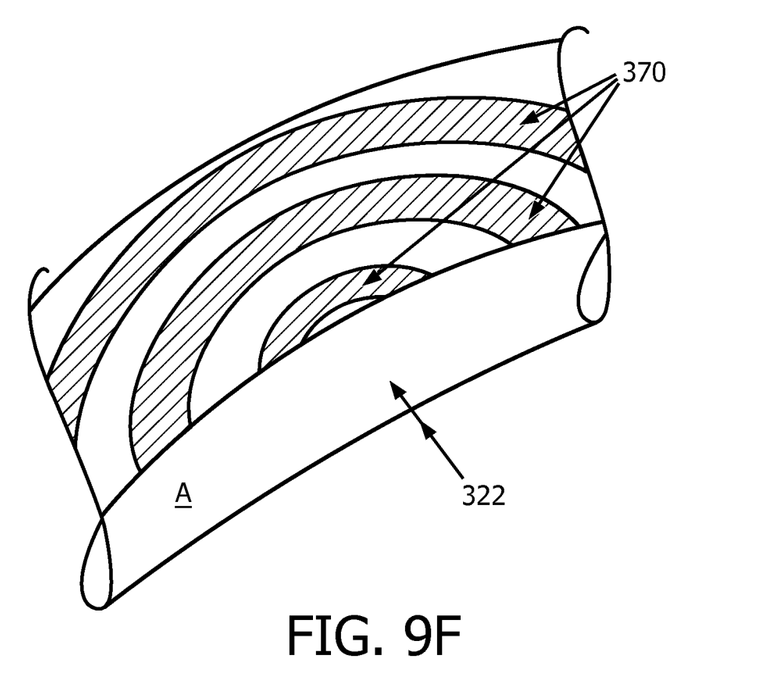
FIG. 9F is an alternate representation of the encircled section of the optical element in FIG. 8, in accordance with an embodiment.

In FIG. 9E, in addition to including a plurality of laser-induced modifications on the inside surface A, a plurality of laser-induced modifications is also included on the top surface C. In example embodiments, the top surface C includes circular laser-marked lines 360 centered at a LED hot spot vector 322. The re-scattering of the laser lines may redirect LED rays toward dark quadrants in a light ring (assuming four LEDs are included) and away from a LED hot spot. In FIG. 9F, a reflective coating is applied to the entireties of the top and bottom surfaces C, D to facilitate light travelling through the optical element to dark quadrants in a light ring. Laser marking technologies can be used to burn away portions of the reflective coating applied to the top surface C and/or the bottom surface D. As shown in FIG. 9F, laser lines that have burned away the reflective coating 370 allow bleeding off of light from a LED hot spot.

Figure 10:
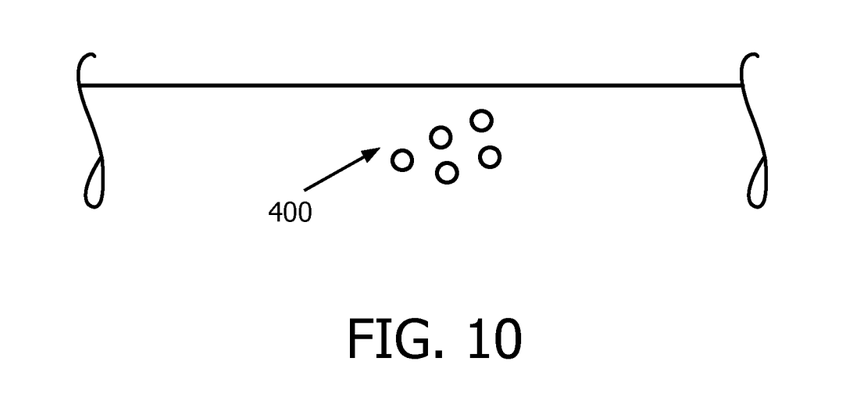
FIG. 10 is an alternate sectional representation of the optical element as shown in FIG. 5 including three dimensional laser-induced modifications inside the optical element.

The laser-induced modifications described herein can be implemented with any suitable laser marking technology. The term "laser-induced modification" refers to any transformation created at a surface, or within the space, of an optical element, including any two dimensional and/or three dimensional transformation, which is caused by an interaction involving laser energy and the optical element (or some coating or finish applied to the surface of the optical element). One example transformation caused by laser marking is the formation of reflow lenses in the surface due to a shrinking of polymer particles when heated. Another example transformation caused by laser marking is the formation of darkened areas in the surface due to a thermal chemical carbonization whereby light energy is absorbed in the substrate and raises the local temperature of the material surrounding the absorption site high enough to cause thermal degradation of the polymer. Alternatively, the texture of the surfaces of the optical element can be modified by laser ablation or any other suitable process. Additionally, one or more lasers can be used with a clear optic to add laser-induced modifications to the internal space of an optical element or interface. In a further example, two lasers can be used with clear optics to provide three dimensional laser-induced modifications to an internal space of an optical element or interface by additive interference where the lasers cross paths to create sufficient energy to cause a material property reaction. FIG. 10 shows an example embodiment of an optical element including three dimensional laser-induced modifications 400 inside the optical element.

Advantageously, the inventive systems and methods described herein provide an optical element for producing a combination distribution effect including bulk material scattering and surface scattering (obviating the need to include costly vapor deposited reflection layers or other additional cost components). The surface scattering effect produced by the laser-enhanced optical element sufficiently distributes light circumferentially such that hot spots and dark spots produced by LEDs are not visible. Point light sources associated with conventional light rings in handheld devices exhibit hot spots and dark spots because the light cannot be sufficiently distributed within the limited physical boundaries of the light ring bulk material. Although the embodiments described herein aid in providing light homogeneity circumferentially about a light ring, it should be appreciated that other circumferential light distributions that are not necessarily uniform yet distributed to provide a specific pattern or image or logo are also contemplated.

Although laser marking is typically used to change the light reflection of a surface of a product for the purpose of mark recognition, the laser-induced modifications described herein, while they can be produced using laser marking, are not used to change the light reflection of the surface for mark recognition. Instead, the laser-induced modifications are configured to control light transmission through the bulk material of the optical element. The laser-induced modifications are formed on an inside surface rather than the exterior surface.

Typical manufacturing processes for producing screens or masks for optical elements require significant space and tactile access to the screen/mask areas. Such typical systems also require specific tooling and manufacturing processes such that the screens or masks cannot be easily changed in manufacturing. The light tailoring of laser-induced modifications described herein can be added in small spaces, where conventional assembly solutions are not possible. Additionally, the systems and methods described herein enable a manufacturer to modify the final output almost immediately, as in inline manufacturing, such that the light performance in each product manufactured can be unique if desired. For example, an optical element can be modified to account for varying manufacturing tolerances. Additionally, handheld devices can be customized to include a user's name, for example, by applying an appropriate arrangement to an optical element such that the user's name can be visible by illuminating the marked optical element (rather than marking the exterior surface for mark recognition).

In example embodiments, laser-induced modifications can be applied to a separate piece of plastic and adhered to the inside surface and/or the top surface of the optical element. In other example embodiments, laser-induced modifications can be applied directly to the inside surface and/or the top surface of the optical element.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A handheld personal care device, comprising:
    a housing;
    at least one light source arranged within the housing, the at least one light source configured to emit light in at least a first direction;
    an optical element comprising an inside surface facing the at least one light source and an outside surface opposite the inside surface, the optical element configured to transmit light from the light source; and
    a plurality of modifications variably distributed on the inside surface or inside the optical element and configured to alter a transmission of light through the optical element, wherein the plurality of modifications are distributed as an inverse of an intensity sphere of the at least one light source.

2. The handheld personal care device of claim 1, wherein the plurality of modifications is configured to provide a uniform distribution of light on the outside of the optical element.

3. The handheld personal care device of claim 1, wherein the plurality of modifications is configured to provide a non-uniform distribution or tailored distribution of light on the outside of the optical element.

4. The handheld personal care device of claim 1, wherein the optical element comprises a bulk scattering material to produce a bulk material scattering effect of the light when the light passes through the optical element and the plurality of modifications provides a surface scattering of the light when the light passes through the optical element.

5. The handheld personal care device of claim 1, wherein the plurality of modifications comprises one or more markings that is dimple-shaped.

6. The handheld personal care device of claim 1, wherein the plurality of modifications comprises one or more charred dots.

7. The handheld personal care device of claim 6, wherein the one or more charred dots block one or more respective portions of light emitted from the at least one light source from being transmitted through the optical element.

8. The handheld personal care device of claim 6, wherein the one or more charred dots are formed by laser energy in combination with one or more polymer additives.

9. The handheld personal care device of claim 1, wherein the at least one light source comprises at least two light sources that are light emitting diodes.

10. A handheld personal care device, comprising:
    a housing;
    at least one light source arranged within the housing, the at least one light source configured to emit light in at least a first direction;
    an optical element comprising an inside surface facing the at least one light source, an outside surface opposite the inside surface, a top surface facing a second direction, different than the first direction, and a bottom surface opposite the top surface, the optical element configured to transmit light from the light source; and
    a plurality of modifications variably distributed on the top surface or inside the optical element and configured to alter a transmission of light through the optical element, wherein the plurality of modifications are distributed as an inverse of an intensity sphere of the at least one light source.

11. The handheld personal care device of claim 10, wherein the plurality of modifications is configured to provide a uniform distribution of light on the outside of the optical element.

12. The handheld personal care device of claim 10, wherein the plurality of modifications is configured to provide a non-uniform distribution or tailored distribution of light on the outside of the optical element.

13. The handheld personal care device of claim 10, wherein the plurality of modifications comprises ribs configured to direct light away from a hot spot vector of the at least one light source.

14. The handheld personal care device of claim 10, wherein the plurality of modifications comprises circular lines centered at a hot spot vector of the at least one light source.

15. The handheld personal care device of claim 10, wherein the at least one light source comprises at least two light sources.

16. The handheld personal care device of claim 1, wherein the optical element surrounds the at least one light source.

17. The handheld personal care device of claim 10, wherein the optical element surrounds the at least one light source.

* * * * *